(12) United States Patent
Wakahara et al.

(10) Patent No.: US 6,658,149 B1
(45) Date of Patent: Dec. 2, 2003

(54) SCHEME FOR IDENTIFYING GRAY-SCALE IMAGE

(75) Inventors: Toru Wakahara, Tokyo (JP); Toshiaki Sugimura, Yokohama (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 0 days.

(21) Appl. No.: 09/473,787

(22) Filed: Dec. 29, 1999

(30) Foreign Application Priority Data

Jan. 7, 1999 (JP) .......................................... P11-001536

(51) Int. Cl.$^7$ ................................................ G06K 9/62
(52) U.S. Cl. ...................................... 382/215; 382/278
(58) Field of Search ................................. 382/215, 278, 382/293; 708/422

(56) References Cited

U.S. PATENT DOCUMENTS 6,009,198 A * 12/1999 Syeda-Mahmood ......... 382/215

FOREIGN PATENT DOCUMENTS

JP  10 255042  9/1998

OTHER PUBLICATIONS

Ben–Arie et al. "Iconic Recognition with Affine–Invariant Spectral Signatures." Proceedings of the 13$^{th}$ Int. Conf. on Pattern Recognition, vol. 1, Aug. 1996, pp. 672–676.*

Wakahara et al. "Adaptive Normalization of Handwritten Characters Using Global/Local Affine Transformation." Proceedings of the 4$^{th}$ Int. Conf. on Document Analysis and Recognition, vol. 1, Aug. 1997, pp. 28–33.*

Wakahara et al. "Affine–Invariant Correlation of Gray–Scale Characters Using GAT Iteration." Proceedings of the 5$^{th}$ Int. Conf. on Document Analysis and Recognition, Sep. 20, 1999, pp. 613–616.*

"Adaptive Normalization of Handwritten Characters Using Global/Local Affine Transformation", *IEEE Transactions on Pattern Analysis and Machine Intelligence*, vol. 20, No. 12, Dec. 1998.

"Shape Matching Using Global Affine Transformation", *The Institute of Electronics, Information and Communication Engineers*, Technical Report of *IEICE*, PRMU96–2 (May 1996).

"Use of Fourier and Karhunen–Loeve Decomposition for Fast Pattern Matching with a Large Set of Templates", *IEEE Transactions on Pattern Analysis and Machine Intelligence*, vol. 19, No. 8, Aug. 1997.

* cited by examiner

Primary Examiner—Jon Chang
(74) Attorney, Agent, or Firm—Kilpatrick Stockton LLP

(57) ABSTRACT

A scheme for identifying input gray-scale image data (F) having noise tolerance and distortion tolerance. The data (F) is composed of a set of gray levels representative of points that form an image. In this scheme, weighting coefficient based on interpoint distances between each point of the input data (F) and each point of the target data (G) and inner products of gray-scale gradients at the points of the input data (F) and target data (G) are calculated; affine parameters for the input data (F) based on the calculated weighting coefficients are determined; an affine transformation is applied to the input data (F) based on the determined affine parameters to shape the input data (F) into affine-transformation-superimposed input gray-scale image data (F*); a correlation value between the transformed data (F*) and the target data (G) are calculated; and, as a matching result for the target data (G), the affine-transformation-superimposed input gray-scale image data (F*) that provides a maximal correlation value and the maximal correlation value itself are provided.

45 Claims, 5 Drawing Sheets

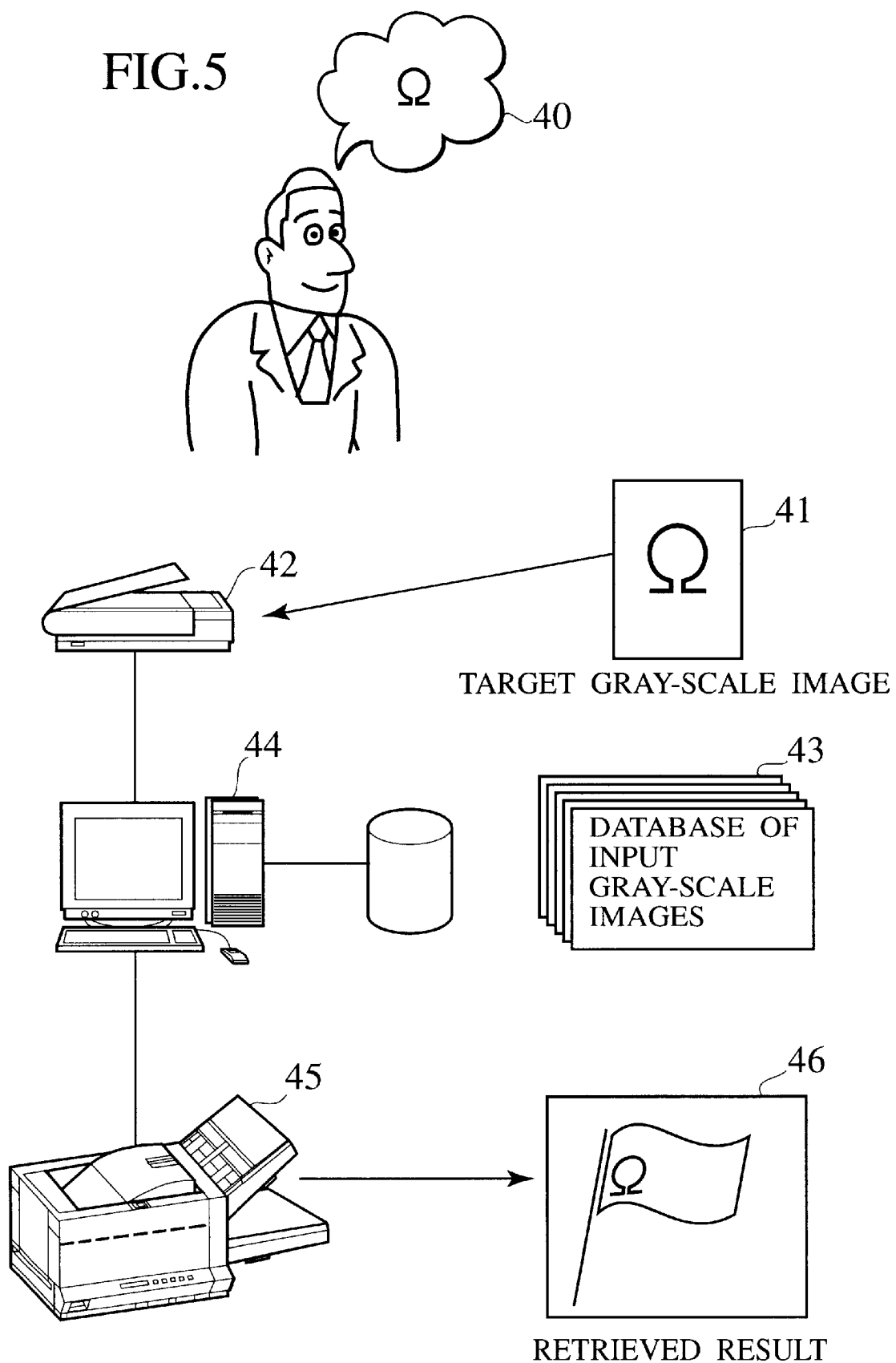

SCHEME FOR IDENTIFYING GRAY-SCALE IMAGE

BACKGROUND OF THE INVENTION

1. Field of the Invention

The present invention relates to a scheme for identifying a gray-scale image. In particular, the present invention relates to a technique of simultaneously improving noise tolerance and distortion tolerance in gray-scale-image identification and recognition that are essential for image pattern recognition, motion analysis, and stereo vision.

2. Description of the Background Art

Distortion tolerance and noise tolerance are serious problems to be solved for gray-scale-image identification techniques.

The techniques to improve distortion tolerance fall into three approaches. They are (1) combinational search, (2) energy minimization, and (3) affine parameter determination.

The first approach, i.e., the combinational search binarizes an input gray-scale image into an input black-point set and then matches the input black-point set and target black-point set. This first approach finds an optimal solution among black-point combinations whose number is of the factorial of the number of points contained in the input black-point set, so that this approach diverges the number of processes to obtain an optimal solution.

A technique of restricting the number of candidate solutions by setting constraints has been studied to prune the branches of a decision search tree to limit the number of processes for an optimal solution. This is disclosed in, for example, H. S. Baird, "Model-Based Image Matching Using Location," Cambridge, Mass.: MIT Press, 1985. Under the constraints, solution algorithm has been proposed for a problem of determining whether or not two point-sets match with each other through congruent transformation (rotation and translation) and a problem of determining whether or not two point-sets match with each other through similar transformation (rotation, scale change, and translation). The number of processes involved in these algorithms is of the order of power of the number of points contained in a point-set. This algorithm is described in, for example, S. Umeyama, "Parametrized point pattern matching and its application to recognition of object families," IEEE Trans. Pattern Analysis and Machine Intelligence, Vol. 15, No. 2, pp. 135–144, 1993.

It is difficult, however, to find general constraints for the above algorithms, and the above algorithms still involve a large number of processes and provide no solution for affine transformation (e.g., rotation, scale change, shearing, and translation) that includes shearing in addition to similar transformation.

On the other hand, the constraints cause local contradiction, and to resolve the local contradiction, discrete relaxation has been proposed. The discrete relaxation method employs interpoint matching coefficients to successively update matching states and converge into a consistent solution, as disclosed in, for example, A. Rosenfeld, R. A. Hummel, and S. W. Zucker, "Scene labeling by relaxation operations," IEEE Trans., Vol. SMC-6, No. 6, pp. 420–433, 1976. The discrete relaxation, however, provides no guidance for rules for updating matching states or a way of setting matching coefficients, involves many processes due to iterations, and guarantees no convergence.

Moreover, these techniques are based on the binarization of a gray-scale image. If the image involves noise, degradation, or background texture, the binarization of the image will fail. Therefore, it is impossible for these techniques to achieve distortion tolerance from the beginning.

The second approach, i.e., the energy minimization is based on dynamic analogy. This approach formulates an image identification problem as an optimization problem based on the energy minimization principle. One effective technique based on this approach introduces image identification constraints into energy functions based on the regularization theory, as disclosed in, for example, T. Poggio, V. Torre, and C. Koch, "Computational vision and regularization theory," Nature, Vol. 317, No. 6035, pp. 314–319, 1985.

Solutions for the energy minimization problem based on a calculus of variations, stochastic relaxation, etc., are disclosed in, for example, B. K. P. Horn and B. G. Schunck, "Determining optical flow," Artificial Intelligence, Vol. 17, pp. 185–203, 1981; M. Kass, A. Witkin, and D. Terzopoulos, "Snakes: active contour models," Int. Journal of Computer Vision, Vol. 1, No. 4, pp. 321–331, 1988; and S. Geman and D. Geman, "Stochastic relaxation, Gibbs distributions, and the Bayesian restoration of images," IEEE Trans. Pattern Analysis and Machine Intelligence, Vol. 6, No. 6, pp. 721–741, 1984.

These are advantageous in analytically or algebraically handling matching problems. They, however, find local optimal solutions from continuous translations based on iterated infinitesimal translations. Accordingly, it is difficult for them to deal with finite or discontinuous translations, or guarantee a convergence to a global optimal solution. In addition, they involve a large number of processes.

The third approach, i.e., the affine parameter determination binarizes an input gray-scale image into an input black-point set and matches it and a target black-point set. This approach directly finds affine parameters that maximize the matching of the input and target images from the iterated solutions of simultaneous linear equations. To evaluate the matching of two images, one technique checks to see if an average of the distances between the proximal black points of the two images has been minimized, as disclosed in T. Wakahara and K. Odaka, "Adaptive normalization of handwritten characters using global/local affine transformation," IEEE Trans. Pattern Analysis and Machine Intelligence, Vol. 20, No. 12, pp. 1332–1341, 1998. Another technique to evaluate the matching of two images checks to see if a likelihood between the two images has been maximized on an assumption that the positions of black points vary according to a normal distribution, as disclosed in Japanese Patent Application No. Hei10-255042 (1998) "Point Pattern Normalization Method and Apparatus." This affine parameter determination is a promising image identification approach in which image can be identified with respect to arbitrary affine parameter. This approach, however, is based on binarization like the above combinational search approach. Accordingly, if an image involves superimposed noise, degradation, or background texture, the binarization itself will fail. Then, it is impossible for this approach to obtain distortion tolerance as such.

On the other hand, to improve noise tolerance, there is a technique of employing normalized cross-correlation as a matching measure for gray-scale images, as disclosed in, for example, A. Rosenfeld and A. C. Kak, Digital Picture Processing, Second edition, San Diego, Calif.: Academic Press, 1982, Chap. 9. It has theoretically been verified that the normalized cross-correlation has a tolerance for a blurring operation on images, as described in, for example, T. Iijima, "Pattern Recognition," Tokyo: Corona, 1973, Chap.6. The normalized cross-correlation is effective to identify an image that involves superimposed noise, degradation, or background texture, as described in, for example, M. Uenohara and T. Kanade, "Use of Fourier and Karhunen-Loeve decomposition for fast pattern matching with a large set of templates," IEEE Trans. Pattern Analysis and Machine Intelligence, Vol. 19, No. 8, pp. 891–898, 1997; and M. Sawaki and N. Hagita, "Recognition of degraded machine-printed characters using a complementary similarity measure and error-correction learning," IEICE Trans. Information and Systems, Vol. E79-D, No. 5, pp. 491–497, 1996. An image identification operation based on the normalized cross-correlation may handle a congruent transformation (e.g., rotation or translation) of an image by thoroughly scanning using templates. This technique, however, has an intrinsic problem of deteriorating correlation values when an affine transformation involving scale change and shearing is applied to an image. In addition, it is practically impossible to thoroughly cover templates to cope with scale change and shearing because the number of processes diverges. Consequently, this normalized cross-correlation approach cannot realize distortion tolerance.

In this way, various techniques for directly recognizing and identifying gray-scale images have tried to improve their distortion tolerance and noise tolerance. In terms of improving distortion tolerance, there are (1) the combinational search carried out between binarized black-point sets, (2) the energy minimization to iterate infinitesimal translations to match gray-scale images with each other, and (3) the affine parameter determination to employ an iterate solution to directly determine affine parameters that maximize the matched area of binarized black-point sets. In terms of improving noise tolerance, there is the normalized cross-correlation.

However, in terms of improving distortion tolerance, there is no technique that is capable of handling a wide range of finite translations and distortions that are not infinitesimal, with a practical number of processes. In terms of improving noise tolerance, the normalized cross-correlation may be effective. This, however, considerably deteriorates correlation values when an affine transformation involving scale change and shearing is applied to images. In other words, there is no technique that simultaneously improves distortion tolerance and noise tolerance. If an input image to be processed involves noise, degradation, or background texture, a binarization operation, which is imperative for these conventional techniques, on the input image will fail. At the same time, the input image will lose gray-scale gradient information that is useful for image matching. It is required, therefore, to provide an accurate image identification technique that directly handles gray-scale images without binarization.

SUMMARY OF THE INVENTION

The present invention has been made to solve the above-mentioned problem of the conventional technique.

It is an object of the present invention is to provide a technique of identifying an input gray-scale image by directly handling the input image while realizing distortion tolerance and noise tolerance. The technique applies an optimal affine transformation (rotation, scale change, shearing, and translation) to the input image in such a way as to maximize normalized cross-correlation between an affine-transformation-superimposed input gray-scale image and a target gray-scale image. The technique identifies the input image with a maximal cross-correlation value. Affine parameters used for the affine transformation are determined by iteratively solving simultaneous linear equations through a practical number of processes. These simultaneous linear equations are derived from maximized weighted normalized cross-correlation that employs gray-scale gradient information to enhance image matching. By maximizing normalized cross-correlation between an affine-transformation-superimposed input gray-scale image and the target image, the technique accurately identifies the input image. Consequently, this technique covers a wide range of translations and distortions represented with arbitrary affine transformations and realizes noise tolerance.

In order to accomplish the object, an aspect of the present invention provides a method of matching input gray-scale image data F with target image data G, the data F being composed of a set of gray levels representative of points that form an image. The method comprises the steps of (a) calculating weighting coefficient based on interpoint distances between the point of the input gray-scale image data F and the point of the target image data G and inner products of gray-scale gradients at the points of the input gray-scale image data F and target image data G; (b) determining affine parameters for the input gray-scale image data F based on the calculated weighting coefficient; (c) applying an affine transformation to the input gray-scale image data F based on the determined affine parameters to shape the input gray-scale image data F into affine-transformation-superimposed input gray-scale image data $F^*$; (d) calculating a normalized cross-correlation value between the affine-transformation-superimposed input gray-scale image data $F^*$ and the target image data G; and (e) providing, as a matching result for the target image data G, at least one of affine-transformation-superimposed input gray-scale image data $F^*$ that provides a correlation value and the correlation value itself.

Another aspect of the present invention provides a method of matching input gray-scale image data F and target image data G, the data F being composed of a set of gray levels representative of points that form an image. The method comprises the steps of (aa) calculating Gaussian kernel interpoint weighting coefficient based on each interpoint distance $\|r-r'\|$ between a point r in the input gray-scale image data F and a point r' in the target image data G and an inner product $\nabla f(r) \cdot \nabla g(r')$ of gray-scale gradients for a gray level f(r) at the point r and a gray level g(r') at the point r'; (bb) determining affine parameter for the input gray-scale image data F based on the calculated Gaussian kernel interpoint weighting coefficient in such a way as to maximize a weighted normalized cross-correlation; (cc) applying an affine transformation to the input gray-scale image data F based on the determined affine parameter to shape the input gray-scale image data F into affine-transformation-superimposed input gray-scale image data $F^*$; (dd) calculating a normalized cross-correlation value $C_1$ between the affine-transformation-superimposed input gray-scale image data $F^*$ and the target image data G as well as a normalized cross-correlation value $C_0$ between the input gray-scale image data F and the target image data G; and (ee) comparing the values $C_1$ and $C_0$ with each other, and if $C_1 > C_0$, substituting the transformed data $F^*$ for the input gray-scale image data F and repeating the steps (aa) to (dd), and if not $C_1 > C_0$, providing at least one of the value $C_0$ and the affine-transformation-superimposed input gray-scale image data $F^*$ corresponding to the value $C_0$ as a matching result for the target image data G.

Still another aspect of the present invention provides a method of retrieving desired image data that includes target image data G from stored gray-scale image data by matching each data piece (F) inputted from the stored image data and the target image data G, the data F being composed of a set of gray levels representative of points that form an image. The method comprises the steps of (aaa) calculating weighting coefficient based on interpoint distances between the point of the input gray-scale image data F and the point of the target image data G and inner products of gray-scale gradients at the points of the input gray-scale image data F and target image data G; (bbb) determining affine parameter for the target image data G based on the calculated weighting coefficient; (ccc) applying an affine transformation to the target image data G based on the determined affine parameter to shape the target image data G into affine-transformation-superimposed target gray-scale image data G*; (ddd) calculating a maximal normalized cross-correlation value between the affine-transformation-superimposed target gray-scale image data G* and the input gray-scale image data F; and (eee) providing at least one of the input gray-scale image data F with which the maximal normalized cross-correlation value exceeds prescribed threshold and the maximal normalized cross-correlation value itself as a retrieval result of a gray-scale image data containing the target image data G.

Still another aspect of the present invention provides an apparatus for matching input gray-scale image data F and target image data G, the data F being composed of a set of gray levels representative of points that form an image. The apparatus comprises (a) a unit for calculating weighting coefficient based on interpoint distances between the point of the input gray-scale image data F and the point of the target image data G and inner products of gray-scale gradients at the points of the input gray-scale image data F and target image data G; (b) a unit for determining affine parameters for the input gray-scale image data F based on the calculated weighting coefficient; (c) a unit for applying an affine transformation to the input gray-scale image data F based on the determined affine parameters to shape the input gray-scale image data F into affine-transformation-superimposed input gray-scale image data F*; (d) a unit for calculating a normalized cross-correlation value between the affine-transformation-superimposed input gray-scale image data F* and the target image data G; and (e) a unit for providing, as a matching result for the target image data G, at least one of affine-transformation-superimposed input gray-scale image data F* that provides a correlation value and the correlation value itself.

Still another aspect of the present invention provides an apparatus for matching input gray-scale image data F and target image data G, the data F being composed of a set of gray levels representative of points that form an image. The apparatus comprises (aa) a unit for calculating Gaussian kernel interpoint weighting coefficient based on each interpoint distance $\|r-r'\|$ between a point r in the input gray-scale image data F and a point r' in the target image data G and an inner product $\nabla f(r) \cdot \nabla g(r')$ of gray-scale gradients for a gray level f(r) at the point r and a gray level g(r') at the point r'; (bb) a unit for determining affine parameter for the input gray-scale image data F based on the calculated Gaussian kernel interpoint weighting coefficient in such a way as to maximize a weighted normalized cross-correlation; (cc) a unit for applying an affine transformation to the input gray-scale image data F based on the determined affine parameter to shape the input gray-scale image data F into affine-transformation-superimposed input gray-scale image data F*; (dd) a unit for calculating a normalized cross-correlation value C, between the affine-transformation-superimposed input gray-scale image data F* and the target image data G as well as a normalized cross-correlation value $C_0$ between the input gray-scale image data F and the target image data G; and (ee) a unit for comparing the values $C_1$ and $C_0$ with each other, and if $C_1 > C_0$, substituting the affine-transformation-superimposed input gray-scale image data F* for the input gray-scale image data F and repeating the operations carried out by the units (aa) to (dd), and if not $C_1 > C_0$, providing at least one of the value $C_0$ and the affine-transformation-superimposed input gray-scale image data F* corresponding to the value $C_0$ as a matching result for the target image data G.

Still another aspect of the present invention provides an apparatus for retrieving desied image data that includes target image data G from stored gray-scale image data by matching each data piece (F) inputted from the stored image data and the target image data G, the data F being composed of a set of gray levels representative of points that form an image. The apparatus comprises (aaa) a unit for calculating weighting coefficient based on interpoint distances between the point of the input gray-scale image data F and the point of the target image data G and inner products of gray-scale gradients at the points of the input gray-scale image data F and target image data G; (bbb) a unit for determining affine parameter for the target image data G based on the calculated weighting coefficient; (ccc) a unit for applying an affine transformation to the target image data G based on the determined affine parameter to shape the target image data G into affine-transformation-superimposed target gray-scale image data G*; (ddd) a unit for calculating a maximal normalized cross-correlation value between the affine-transformation-superimposed target gray-scale image data G* and the input gray-scale image data F; and (eee) a unit for providing at least one of the input gray-scale image data F with which the maximal normalized cross-correlation value exceeds prescribed threshold and the maximal normalized cross-correlation value itself as a retrieval result of a gray-scale image data containing the target image data G.

Still another aspect of the present invention provides a computer readable recording medium recording a program for causing the computer to execute processing for matching input gray-scale image data F and target image data G, the data F being composed of a set of gray levels representative of points that form an image. The processing includes (a) a process for calculating weighting coefficient based on interpoint distances between the point of the input gray-scale image data F and the point of the target image data G and inner products of gray-scale gradients at the points of the input gray-scale image data F and target image data G; (b) a process for determining affine parameter for the input gray-scale image data F based on the calculated weighting coefficient; (c) a process for applying an affine transformation to the input gray-scale image data F based on the determined affine parameters to shape the input gray-scale image data F into affine-transformation-superimposed input gray-scale image data F*; (d) a process for calculating a normalized cross-correlation value between the affine-transformation-superimposed input gray-scale image data F* and the target image data G; and (e) a process for providing, as a matching result for the target image data G, at least one of affine-transformation-superimposed input gray-scale image data F* that provides a correlation value and the correlation value itself.

Still another aspect of the present invention provides a computer readable recording medium recording a program for causing the computer to execute processing for matching input gray-scale image data F with target image data G, the data F being composed of a set of gray levels representative of points that form an image. The processing includes (aa) a process for calculating Gaussian kernel interpoint weighting coefficient based on each interpoint distance $\|r-r'\|$ between a point r in the input gray-scale image data F and a point r' in the target image data G and an inner product $\nabla f(r) \cdot \nabla g(r')$ of gray-scale gradients for a gray level f(r) at the point r and a gray level g(r') at the point r'; (bb) a process for determining affine parameter for the input gray-scale image data F based on the calculated Gaussian kernel interpoint weighting coefficient in such a way as to maximize a weighted normalized cross-correlation; (cc) a process for applying an affine transformation to the input gray-scale data F based on the determined affine parameter to shape the input gray-scale image data F into affine-transformation-superimposed input gray-scale image data F*; (dd) a process for calculating a normalized cross-correlation value $C_1$ between the affine-transformation-superimposed input gray-scale image data F* and the target image data G as well as a normalized cross-correlation value $C_0$ between the input gray-scale image data F and the target image data G; and (ee) a process for comparing the values $C_1$ and $C_0$ with each other, and if $C_1 > C_0$, substituting the affine-transformation-superimposed input gray-scale image data F* for the input gray-scale image data F and repeating the processes (aa) to (dd), and if not $C_1 > C_0$, providing at least one of the value $C_0$ and the affine-transformation-superimposed input gray-scale image data F* corresponding to the value $C_0$ as a matching result for the target image data G.

Still another aspect of the present invention provides a computer readable recording medium recording a program for causing the computer to execute processing for retrieving desired image data that includes target image data G from stored gray-scale image data by matching each data piece F inputted from the stored image data and the target image data G, the data F being composed of a set of gray levels representative of points that form an image. The processing includes (aaa) a process for calculating weighting coefficient based on interpoint distances between the point of the input gray-scale image data F and the point of the target image data G and inner products of gray-scale gradients at the points of the input gray-scale image data F and target image data G; (bbb) a process for determining affine parameter for the target image data G based on the calculated weighting coefficient; (ccc) a process for applying an affine transformation to the target image data G based on the determined affine parameter to shape the target image data G into affine-transformation-superimposed target gray-scale image data G*; (ddd) a process for calculating a maximal normalized cross-correlation value between the affine-transformation-superimposed target gray-scale image data G* and the input gray-scale image data F; and (eee) a process for providing at least one of the input gray-scale image data F with which the maximal normalized cross-correlation value exceeds prescribed threshold and the maximal normalized cross-correlation value itself as a retrieval result of a gray-scale image data containing the target image data G.

Other features and advantages of the present invention will become apparent from the following description taken in conjunction with the accompanying drawings.

BRIEF DESCRIPTION OF THE DRAWINGS

The accompanying drawings, which are incorporated in and constitute a part of the specification, illustrate presently preferred description given above and the detailed description of the preferred embodiments given below, serve to explain the principle of the invention.

FIG. 5 shows an exemplary application of the present invention for retrieving image frame from a large number of image contents with a given image as a search key.

DETAILED DESCRIPTION OF THE PREFERRED EMBODIMENTS

Figure 1:
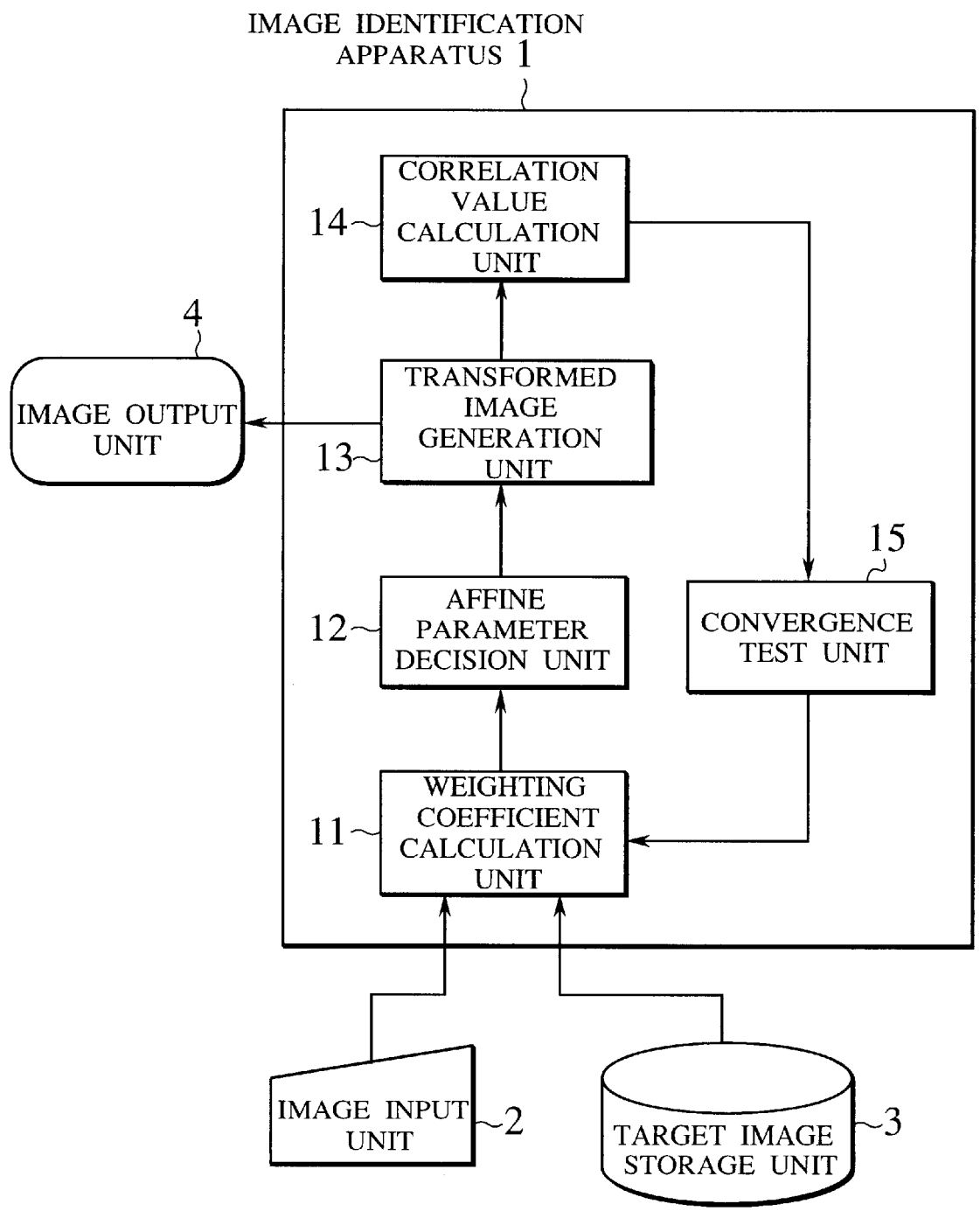
FIG. 1 is a block diagram showing a functional structure of an image identification apparatus according to an embodiment of the present invention.

A scheme for identifying a gray-scale image according to an embodiment of the present invention will be explained in detail with reference to FIGS. 1 to 5.

First, the principle of the present invention will be explained.

To directly handle an input gray-scale image without binarization and to realize tolerance for superimposed noise, blur, collapse, and background texture contained in the image, the present invention employs normalized cross-correlation as a matching measure. Moreover, to realize distortion tolerance for a wide range of affine transformations, the present invention employs optimal affine parameters to shape an input gray-scale image in such a way as to maximize normalized cross-correlation. Namely, the present invention determines the optimal affine parameters with the use of a successive iteration method and applies the determined affine parameters to the input gray-scale image to shape the input gray-scale image into an affine-transformation-superimposed input gray-scale image. Then, the present invention calculates a normalized cross-correlation value between the input image and the affine-transformation-superimposed input gay-scale image that is shaped by the affine parameter and a target gray-scale image. This normalized cross-correlation value absorbs distortion due to the affine transformation. When the normalized cross-correlation value exceeds a given threshold, the input gray-scale image is identified. The present invention employs gray-scale gradient information for preparing weighting coefficients to efficiently find the optimal affine parameters. Consequently, the image identification technique of the present invention simultaneously realizes noise tolerance and distortion tolerance.

This embodiment matches an input gray-scale image F that is on a two-dimensional plane and a target gray-scale image G that is on a two-dimensional plane. To achieve this, this embodiment introduces an affine transformation on the input gray-scale image F, to form an affine-transformation-superimposed input gray-scale image F* in such a way as to maximize normalized cross-correlation between the transformed image F* and the target image G. Namely, this embodiment provides a maximal normalized cross-correlation value that absorbs the affine transformation and realizes noise tolerance.

To carry out an affine transformation, this embodiment calculates Gaussian kernel interpoint weighting coefficients based on interpoint distances between the points of the image F and the points of the target image G and the inner products of gray-scale gradients of the image F and the image G. Then, this embodiment uses the weighting coefficients to determine affine parameters in such a way as to maximize weighted normalized cross-correlation.

More particularly, an apparatus for identifying an image according to an embodiment of the present invention will be explained in detail. The apparatus receives an input gray-scale image F that is on a two-dimensional plane and a target gray-scale image G that is also on a two-dimensional plane. The input image F is expressed as $F=\{r, f(r)\}$, where $f(r)$ is the gray level of a point r of the input image F, and r is a position vector. The target image G is expressed as $G=\{r', g(r')\}$, where $g(r')$ is the gray level of a point r' of the target image G, and r' is a position vector. The apparatus carries out an affine transformation $Ar+b$ that is optimal for each point r of the input image F, to generate an affine-transformation-superimposed input gray-scale image $F^*$. In the affine transformation $Ar+b$, "A" is a 2×2 matrix consisting of two rows and two columns to express rotation, scale change, and shearing, and "b" is a two-dimensional vector to express translation. The apparatus detects a maximal normalized cross-correlation value between the transformed image $F^*$ and the target image G. These processes enable the apparatus to realize image identification with respect to arbitrary affine parameter and to realize noise tolerance in identifying an input gray-scale image.

First, this embodiment is capable of handling arbitrary affine transformations for translation and distortion. Compared with the conventional techniques that handle congruent and similar transformations, this embodiment expands a tolerable range of translations and distortions and realizes high distortion tolerance.

Second, this embodiment is capable of determining affine parameters such that a normalized cross-correlation value between an affine-transformation-superimposed input gray-scale image, which is generated based on the affine parameters and an input gray-scale image, and a target gray-scale image is maximized, thereby realizing noise tolerance. A normalized cross-correlation value is defined as the correlation value calculated between gray-scale image data with normalized gray level of zero average and unit variance.

Third, this embodiment is capable of efficiently determining affine parameters by iteratively finding a maximal weighted normalized cross-correlation through a practical number of processes. This technique is for general purpose and involves no optional control parameters.

In this way, this embodiment is capable of handling arbitrary affine transformations to cover a wide range of translations and distortions. This embodiment realizes noise tolerance based on normalized cross-correlation values and correctly identifies an input gray-scale image through a practical number of processes.

Next, an exemplary structure of the image identification apparatus according to this embodiment of he present invention will be explained.

FIG. 1 is a block diagram showing a functional structure of the image identification apparatus according to this embodiment of the present invention.

The image identification apparatus 1 comprises a weighting coefficient calculation unit 11, an affine parameter decision unit 12, a transformed image generation unit 13, a correlation value calculation unit 14, and a convergence test unit 15. The apparatus 1 may be comprises an image input unit 2, a target image storage unit 3, and an image output unit 4.

The weighting coefficient calculation unit 11 calculates a Gaussian kernel interpoint weighting coefficient between each point r of input gray-scale image F and a each point r' of target image G based on an interpoint distance $\|r-r'\|$ and an inner product $\nabla f(r) \cdot \nabla g(r')$. Here, $\| \ldots \|$ is a vector norm and $\nabla$ is a differential operator for calculating a gradient, and r and r' denote arbitrary two-dimensional positional vectors in the two-dimensional plane (domain.).

According to the Gaussian kernel interpoint weighting coefficients calculated by the weighting coefficient unit 11 for the data F and G, the affine parameter decision unit 12 generates simultaneous linear equations to be satisfied by optimal affine parameters A and b. These affine parameters are expected to maximize a normalized cross-correlation between an affine-transformation-superimposed input gray-scale image $F^*$, which is formed from the affine parameters and the input data F, and the target image G. The affine parameter decision unit 12 solves the simultaneous linear equations so as to determine the optimal affine parameters.

Using the affine parameters determined by the affine parameter decision unit 12, the transformed image generation unit 13 applies an affine transformation ($Ar+b$) to each point r of the input image F and generates an affine-transformation-superimposed input gray-scale image $F^*$.

The correlation value calculation unit 4 calculates a normalized cross-correlation value $C_1$ between the transformed image $F^*$ (that is, affine-transformation-superimposed input gray-scale image $F^*$) and the target image G, as well as a normalized cross-correlation value $C_0$ between the input image F and the target image G.

The convergence test unit 15 compares the values $C_1$ and $C_0$ with each other. If $C_1 > C_0$, the convergence test unit 15 substitutes the transformed image $F^*$ for the input image F and sends the substituted input image F to the weighting coefficient calculation unit 11. Then, the affine transformation process mentioned above is iterated. On the other hand, if not $C_1 > C_0$, the maximal normalized cross-correlation value $C_0$ is sent as a gray-scale image matching result to the image output unit 4. The matching result may include the transformed image $F^*$ (i.e., affine-transformation-superimposed input gray-scale image $F^*$) corresponding to the maximal normalized cross-correlation value $C_0$.

The image input unit 2 enters the input gray-scale image F into the weighting coefficient calculation unit 11.

The target image storage unit 3 stores the target gray-scale image G in advance. The target gray-scale image G serves as an image retrieval key.

The image output unit 4 outputs an identified image according to a gray-scale image matching result provided by the convergence test unit 15.

Figure 2:
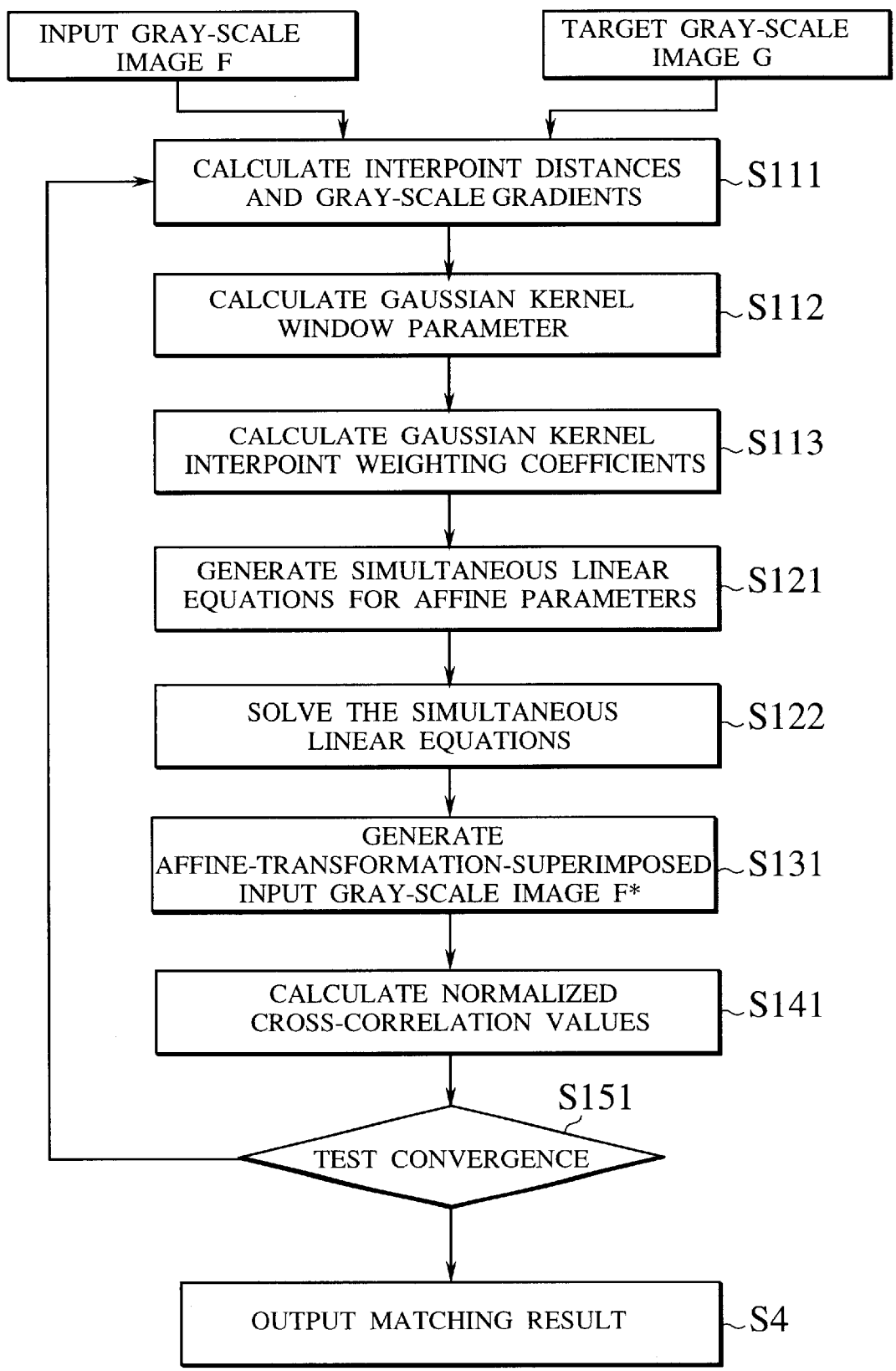
FIG. 2 is a flowchart showing procedures of identifying an image according to an embodiment of the present invention.

FIG. 2 is a flowchart showing process procedures of the image identification processing carried out by the apparatus according to this embodiment.

The weighting coefficient calculation unit 11 calculates an interpoint distance between each point r of the input gray-scale image F or an affine-transformation-superimposed input gray-scale image $F^*$ and each point r' of the target gray-scale image G and gray-scale gradients at the points (step S111). The weighting coefficient calculation unit 11 calculates a Gaussian kernel window parameter D for weighting coefficients (step S112). The weighting coefficient calculation unit 11 calculates Gaussian kernel interpoint weighting coefficients based on the interpoint distances, the gray-scale gradients, and the window parameter (step S113).

The affine parameter calculation unit 12 generates simultaneous linear equations for affine parameter (step S121), and solves the equations to determine affine parameters (step S122).

The transformed image generation unit 13 applies an affine transformation to the input image F according to the determined affine parameters and generates an affine-transformation-superimposed input gray-scale image F* (step S131).

The correlation value calculation unit 14 calculates a normalized cross-correlation value between the target image G and the input image F and a normalized cross-correlation value between the target image G and the affine-transformation-superimposed input gray-scale image F* (step S141).

The convergence test unit 15 compares the normalized cross-correlation values with each other and determines whether or not the image identification process has converged (step S151).

Next, the details of the image identification process carried out by the apparatus according to this embodiment of the present invention will be explained.

The input gray-scale image F entered through the image input unit 2 consists of the X- and Y-coordinates of the position vector of each point r of the input image F, and a set $\{r, f(r)\}$ of the gray levels $f(r)$ of the points of the input image F. The average and variance of the gray levels $f(r)$ are normalized as follows:

$$\int f(r)dr=0 \text{ and } \int f(r)|^2 dr=1 \qquad (1)$$

The target image storage unit 3 stores the X- and Y-coordinates of the position vector of each point r' of the target gray-scale image G and a set $\{r', g(r')\}$ of the gray levels $g(r')$ of the points of the target image G. The average and variance of the gray levels $g(r')$ are The weighting coefficient calculation unit 11 calculates weighting coefficient. More precisely, step S111 calculates an interpoint distance $\mu r - r'\|$ between each point r of input gray-scale image F and each point r' of target image G and an inner product $\nabla f(r) \cdot \nabla g(r')$ of gray-scale gradients at the points r and r'. According to the calculated interpoint distances and inner products, step S113 calculates Gaussian kernel interpoint weighting coefficients $\omega(r, r')$ as follows:

$$\omega(r,r')=\max\{\nabla f(r)\cdot\nabla g(r'),0\}\exp[-\|r-r'\|^2/D] \qquad (3)$$

where $\|\ldots\|$ is a vector norm, e.g., a Euclidean norm, $\nabla$ is a differential operator for calculating a gradient, $\nabla f(r)\cdot\nabla g(r')$ is an inner product operation for gradient vectors of $f(r)$ and $g(r')$, and D is a window parameter for controlling the spread of a Gaussian kernel function.

An average of the distances $\|r-r'\|^2$ between the points r of the input image F and the nearest neighbor points r' of the target image G having the same gray levels as the points r is "$D_2$." An average of the distances $\|r-r'\|^2$ between the points r' of the target image G and the nearest neighbor points r of the input image F having the same gray levels as the points r' is "$D_2$." Then, step S112 obtains the window parameter D as follows:

$$D=(D_1+D_2)/2$$

$$D_1=\text{mean}_{r\in F}[\min_{r'\in G}\|r-r'\|^2; g(r')=f(r)]$$

$$D_2=\text{mean}_{r'\in F}[\min_{r'\in F}\|r'-r\|^2; f(r')=g(r)] \qquad (4)$$

$$\nabla f(r)\cdot\nabla g(r')=|\nabla f(r)||\nabla g(r')|\cos\theta \qquad (5)$$

where $\theta$ is an angle between gray-scale gradient vectors $\nabla f(r)$ and $\nabla g(r')$.

The factor "$\max\{\nabla f(r)\cdot\nabla g(r'),0\}$" in the expression (3) is positive only when the angle $\theta$ is below 90 degrees and becomes zero if the angle $\theta$ exceeds 90 degrees. Namely, this factor evaluates the similarity of gray-scale gradients at the point r of the input image F and the point r' of the target image G in order to enhance image matching. The set of Gaussian kernel interpoint weighting coefficients $\{\omega(r, r'); \forall r\in F, \forall r'\in G\}$ calculated according to the expressions (3) and (4) are sent to the affine parameter decision unit 12.

The affine parameter decision unit 12 determines affine parameters. Namely, step S121 generates simultaneous linear equations to determine affine parameters A and b for the input image F in such a way as to maximize a normalized cross-correlation with respect to the target image G. Here, "A" is a 2×2 matrix representing rotation, scale change, and shearing, and "b" is a two-dimensional position vector representing translation. The affine transformation processing moves each point r of the input image F to a new position of $r^*=Ar+b$ with the same gray level $f(r)$.

Namely, the affine transformation forms the following affine-transformation-superimposed input gray-scale image F* that is obtained after the affine transformation:

$$F^*=\{r^*, f^*(r^*)\}=\{Ar+b, f(r)\} \qquad (6)$$

A normalized cross-correlation value $C_0$ between the input image F that is obtained before the affine transformation and the target image G is expressed as follows:

$$C_0=\int f(r)g(r)dr \qquad (7)$$

On the other hand, a normalized cross-correlation value $C_1$ between the transformed image F* and the target image G is expressed as follows:

$$C_1=\int f^*(r)g(r)dr=\int f(r)g(Ar+b)dr \qquad (8)$$

Due to the normalization according to the expressions (1) and (2), the normalized cross-correlation values of the expressions (7) and (8) are theoretically guaranteed to have tolerance for noise as described in, for example, T. Iijima, "Pattern Recognition," Tokyo Corona, 1973, Chap. 6.

Namely, the affine parameters A and b for the input gray-scale image F that maximize a normalized cross-correlation with respect to the target image G maximize the value $C_1$ of the expression (8). The right side of the expression (8) includes the unknown components A and b as arguments of a gray level g which is generally not an analytic function. As a result, it is impossible to carry out differential operations with respect to A and b, and therefore, thorough trial and error must be repeated to find A and b which maximize the value $C_1$. This results in diverging the number of processes, and there is no guarantee to obtain an optimal solution. To cope with this problem, this embodiment introduces an objective function $\psi$ of the following expression (9) in which the unknown components A and b are included only in an analytic Gaussian kernel, to analytically find optimal solutions for A and b without trial and error.

$$\psi=\int\int f(r)g(r')\exp[-\|Ar+b-r'\|^2/D]dr\, dr' \qquad (9)$$

In this expression (9), the Gaussian kernel part becomes a delta function $\delta(Ar+b-r')$ at a limit of $D\to 0$, to agree with the cross-correlation value $C_1$ of the expression (8). By controlling the window parameter D to realize $D\to 0$, A and b that maximize the value $C_1$ will be obtained if the objective function $\psi$ is maximized. The window parameter D is calculated according to the expression (4). In practice, iterations of affine transformation operations guarantee a monotonous decrease in the value D.

A condition to maximize the objective function ψ is to zero a value obtained by partially differentiating the objective function ψ with respect to A and b. By applying this to the expression (9), simultaneous linear equations to be satisfied with the optimal affine parameters A and b will be as follows:

$$O = \partial\Psi/\partial A \propto \int\int f(r)g(r')r(Ar+b-r')^T \exp[-\|Ar+b-r'\|^2/D]dr\,dr'$$

$$O = \partial\Psi/\partial b \propto \int\int f(r)g(r')(Ar+b-r')\exp[-\|Ar+b-r'\|^2/D]dr\,dr' \quad (10)$$

where T specifies a transposed vector, O is a zero matrix, and 0 is a zero vector.

The simultaneous equations in the expression (10), however, are nonlinear with respect to unknown affine parameters A and b, and therefore, are analytically unsolvable. To cope with this problem, the simultaneous equations are linearized and a successive iteration method is employed. More precisely, only A and b serving as arguments of the Gaussian kernel part of the expression (10) are approximated with a unit matrix and a zero vector, respectively, to obtain the following simultaneous linear equations:

$$O = \int\int f(r)g(r')r(Ar+b-r')^T \exp[-\|r-r'\|^2/D]dr\,dr'$$

$$O = \int\int f(r)g(r')(Ar+b-r')\exp[-\|r-r'\|^2/D]dr\,dr' \quad (11)$$

The Gaussian kernel part of the above expression is replaced with the Gaussian kernel interpoint weighting coefficients ω(r, r') calculated (step S113) as follows:

$$O = \int\int f(r)g(r')r(Ar+b-r')^T \omega(r,r')dr\,dr'$$

$$O = \int\int f(r)g(r')(Ar+b-r')\omega(r,r')dr\,dr' \quad (12)$$

By using the Gaussian kernel interpoint weighting coefficients, the similarity of gray-scale gradients at the point r of the input image F and the point r' of the target image G are reflected in the equations to enhance image matching. The simultaneous linear equations containing affine parameters as unknown variables generated by the expression (12) are solved according to known numerical solutions, for example, the Gaussian elimination method described in, for example, Mathematical Society of Japan, Encyclopedic Dictionary of Mathematics, Cambridge, Mass.:, MIT Press, 1977, to determine the optimal affine parameters A and b for the input gray-scale image F in step S122. The affine parameters A and b thus obtained are sent to the transformed image generation unit 13.

The transformed image generation unit 13 generates a transformed gray-scale image (step S131). Namely, the transformed image generation unit 13 employs the affine parameters A and b provided by the affine parameter decision unit 12 to move each point r of the input image F to a point r* with the gray level f(r) being unchanged as follows:

$$r^* = Ar+b \quad (13)$$

This expression (13) generates an affine-transformation-superimposed input gray-scale image $F^* \equiv \{r^*, f^*(r^*)\} = \{Ar+b, f(r)\}$, which is sent to the correlation value calculation unit 14.

The correlation value calculation unit 14 calculates a normalized cross-correlation value $C_1$ between the transformed image F* (affine-transformation-superimposed input gray-scale image F*) and the target image G according to the expression (8), as well as a normalized cross-correlation value $C_0$ between the input gray-scale image F and the target image G according to the expression (7) (step S141). Due to the normalization based on the expressions (1) and (2), the normalized cross-correlation values $C_0$ and $C_1$ are in the range of [−1.0, +1.0]. The values $C_0$ and $C_1$ those are the value before and after the affine transformation are sent to the convergence test unit 15.

In the above explanation, the input gray-scale image F and target image G are analog data. If they are digital data, some techniques specific to digital data are needed.

Next, processing of identifying a digital image according to a modification of this embodiment mentioned above will be explained.

An input gray-scale image F is on a two-dimensional plane, and a target gray-scale image G is also on a two-dimensional plane. The images F and G are expressed with functions f(i, j) and g(i, j), respectively, that indicate gray levels at X and Y integer coordinate sets (i, j). Here, "i" is defined as $1 \leq i \leq M$ and "j" is defined as $1 \leq j \leq N$ with M×N being equal to the total number of pixels of each digital image.

In relation to the expressions (1) and (2), the average and variance of the gray levels f(i, j) and g(i, j) are normalized as follows:

$$\Sigma_i\Sigma_j f(i,j)=0 \text{ and } \Sigma_i\Sigma_j|f(i,j)|^2=1 \quad (1')$$

$$\Sigma_i\Sigma_j g(i,j)=0 \text{ and } \Sigma_i\Sigma_j|g(i,j)|^2=1 \quad (2')$$

where $\Sigma_i$ is the sum with i=1 to M and $\Sigma_j$ is the sum with j=1 to N.

The Gaussian kernel interpoint weighting coefficients of the expression (3) are given as follows:

$$\omega(i,j,i',j') = \max\{\nabla f(i,j) \cdot \nabla g(i',j'),\, 0\}\exp[-((i-i')^2+(j-j')^2)/D] \quad (3')$$

There are several known methods to calculate a gradient vector $\nabla f(i, j)$ or $\nabla g(i', j')$ for a digital image. For example, the Roberts method calculates $\nabla f(i, j)$ by combining the differences of gray levels in the directions of 45 degrees and 135 degrees for a given pixel f(i, j) in the input gray-scale image F as follows:

$$\nabla_{45°}f(i,j) = f(i+1,j) - f(i,j+1)$$

$$\nabla_{135°}f(i,j) = f(i,j) - f(i+1,j+1)$$

This method is disclosed in A. Rosenfeld and A. C. Kak, "Digital Picture Processing," Second Edition, Chap. 10, Academic Press, 1982.

The window parameter D of the expression (4) is calculated as follows:

$$D = (D_1 + D_2)/2$$

$$D_1 = \text{mean}_F[\min_G((i-i')^2+(j-j')^2); g(i',j')=f(i,j)]$$

$$D_2 = \text{mean}_G[\min_F((i'-i)^2+(j'-j)^2); f(i,j)=g(i',j')] \quad (4')$$

where "mean" is a mean value of the whole of the image and "min" is a minimum value of the whole of the image.

The normalized cross-correlation $C_0$ of the expression (7) is calculated as follows:

$$C_0 = \Sigma_i\Sigma_j f(i,j)g(i,j) \quad (7')$$

The affine parameters A and b are expressed with components as follows:

$$A = \begin{pmatrix} a_{11} a_{12} \\ a_{21} a_{22} \end{pmatrix}, \quad b = \begin{pmatrix} b_1 \\ b_2 \end{pmatrix}$$

Then, the simultaneous linear equations of the expression (12) to determine optimal affine parameters A and b for the digital image are written as follows:

$$0 = \Sigma_i \Sigma_j \Sigma_{i'} \Sigma_{j'} \omega(i,j,i',j') f(i,j) g(i',j') i(a_{11} \cdot i + a_{12} \cdot j + b_1 - i')$$

$$0 = \Sigma_i \Sigma_j \Sigma_{i'} \Sigma_{j'} \omega(i,j,i',j') f(i,j) g(i',j') i(a_{21} \cdot i + a_{22} \cdot j + b_2 - j')$$

$$0 = \Sigma_i \Sigma_j \Sigma_{i'} \Sigma_{j'} \omega(i,j,i',j') f(i,j) g(i',j') j(a_{11} \cdot i + a_{12} \cdot j + b_1 - i')$$

$$0 = \Sigma_i \Sigma_j \Sigma_{i'} \Sigma_{j'} \omega(i,j,i',j') f(i,j) g(i',j') j(a_{21} \cdot i + a_{22} \cdot j + b_2 - j')$$

$$0 = \Sigma_i \Sigma_j \Sigma_{i'} \Sigma_{j'} \omega(i,j,i',j') f(i,j) g(i',j') (a_{11} \cdot i + a_{12} \cdot j + b_1 - i')$$

$$0 = \Sigma_i \Sigma_j \Sigma_{i'} \Sigma_{j'} \omega(i,j,i',j') f(i,j) g(i',j') (a_{21} \cdot i + a_{22} \cdot j + b_2 - j') \quad (12')$$

where $\Sigma_{i'}$ indicates the sum with i'=1 to M and $\Sigma_{j'}$ indicates the sum with j'=1 to N. These simultaneous linear equations with six unknown variables are easy to solve, like the expression (12), according to known numerical solutions, for example, the Gaussian elimination method. As a result, the affine parameters A and b are determined for the digital image.

An affine transformation method applied to a digital image will be explained. This method provides a function $f^*(i^*, j^*)$ ($1 \leq i^* \leq M$, $1 \leq j^* \leq N$) to represent the gray levels of an affine-transformation-superimposed input gray-scale image $F^*$. However, the affine transformation expression (13) for analog images is inapplicable to digital images. If the expression (13) is employed as it is, the following will be obtained:

$$i^* = \text{int}[a_{11} \cdot i + a_{12} \cdot j + b_1]$$

$$j^* = \text{int}[a_{21} \cdot i + a_{22} \cdot j + b_2]$$

where int[ ] indicates an operation for making an integer by rounding of or cutting off fractions. This operation is needed because the affine parameters A and b are real numbers and because $i^*$ and $j^*$ are integers. Even if X and Y integer coordinate sets (i, j) entirely cover the range of $1 \leq i \leq M$ and $1 \leq j \leq N$, it is not guaranteed that X and Y coordinate sets ($i^*$, $j^*$) provided by the above expressions entirely cover the ranges of $1 \leq i^* \leq M$ and $1 \leq j^* \leq N$. This is apparent, for example, when the affine parameter A indicates expansion. Accordingly, if the expression (13) is applied as it is to digital images, an affine-transformation-superimposed input image $F^*$ will include pixels whose gray levels are undetermined. To cope with this problem, inverse transformation is applied to affine transformation. This will be explained.

Figure 3:
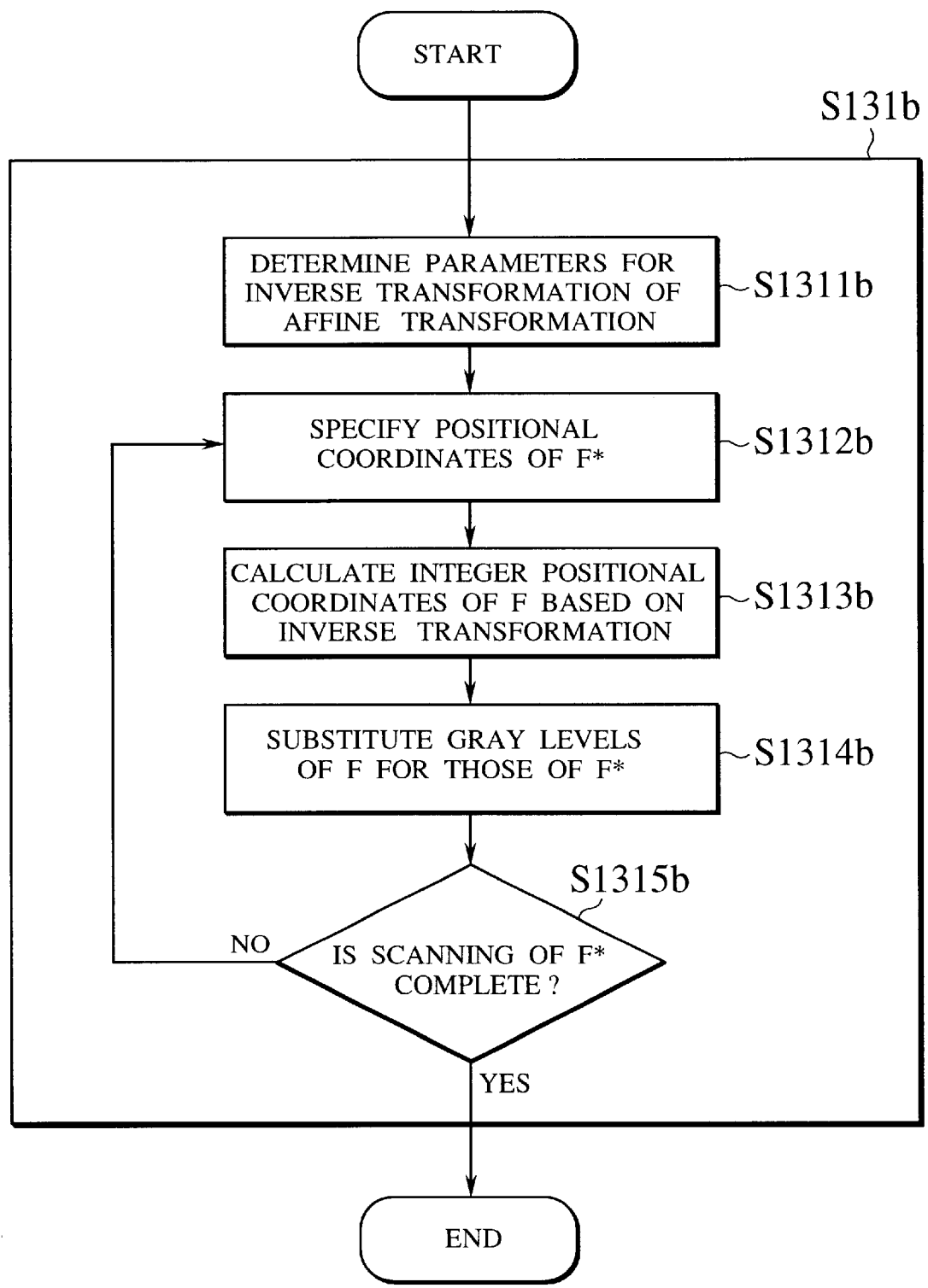
FIG. 3 is a flowchart showing detailed procedures of generating a transformed image in an image identification process according to a modification of the embodiment of FIG. 2.

FIG. 3 is a flowchart showing the details of a processing (step S131b) for generating an affine-transformation-superimposed input gray-scale image from a digital image.

Step S1311b determines parameters $A^*$ and $b^*$ that express an inverse transformation of affine parameters A and b. The expression (13) is modified as follows:

$$r = A^{-1}(r^* - b) \quad (13')$$

where $A^{-1}$ is an inverse matrix of A. This provides the following:

$$A^* = A^{-1}, b^* = -A^{-1} b \quad (14)$$

The parameters $A^*$ and $b^*$ for inverse transformation determined by the expression (14) are expressed as follows:

$$A^* = \begin{pmatrix} a^*_{11} a^*_{12} \\ a^*_{21} a^*_{22} \end{pmatrix}, \quad b^* = \begin{pmatrix} b^*_1 \\ b^*_2 \end{pmatrix}$$

Step S1312b successively specifies the positional coordinates ($i^*$, $j^*$) of an affine-transformation-superimposed input gray-scale image $F^*$ with $1 \leq i^* \leq M$, and $1 \leq j^* \leq N$.

Step S1313b uses the transformation parameters $A^*$ and $b^*$ of the expression (14) to calculate integer positional coordinates (i, j) through the inverse transformation of the specified positional coordinates ($i^*$, $j^*$) as follows:

$$i = \text{int}[a^*_{11} \cdot i^* + a^*_{12} \cdot j^* + b^*_1]$$

$$j = \text{int}[a^*_{21} \cdot i^* + a^*_{22} \cdot j^* + b^*_2] \quad (15)$$

where int[ ] is an operation for making an integer.

Step S1314b substitutes gray levels f(i, j) at the integer positional coordinates (i, j) of the input gray-scale image F for gray levels $f^*(i^*, j^*)$ at the specified positional coordinates ($i^*$, $j^*$) of the transformed image $F^*$ as follows:

$$f^*(i^*, j^*) = f(i, j) \quad (16)$$

This determines the gray levels of the transformed image $F^*$.

Step S1315b checks to see if every pixel of the transformed image $F^*$ has been scanned and a gray level for the pixel has been determined. If not, steps S1312b to S1314b are repeated until the specified positional coordinates ($i^*$, $j^*$) of the transformed image $F^*$ completely cover the ranges of $1 \leq i^* \leq M$, and $1 \leq j^* \leq N$.

In this way, an inverse transformation operation of affine transformation determines the gray levels of all pixels of an affine-transformation-superimposed input gray-scale image $F^*$ based on a digital input image.

Returning to FIG. 2, a convergence test unit 15 carries out a convergence test (step S151). Namely, the convergence test unit 15 compares the two normalized cross-correlation values $C_0$ and $C_1$ provided by the correlation value calculation unit 14 with each other. If not $C_1 > C_0$, i.e., if $C_1$ is not increased from $C_0$, the convergence test unit 15 provides the maximal normalized cross-correlation value $C_0$ as a matching result.

Figure 4A:
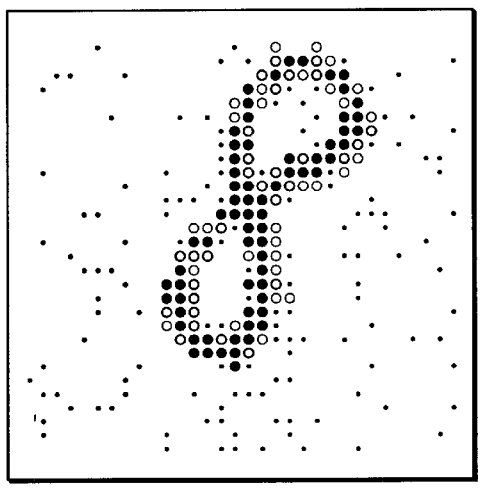
FIGS. 4A to 4F show an exemplary of an image identifying operation based on iterations of affine transformation according to the present invention.
Figure 4B:
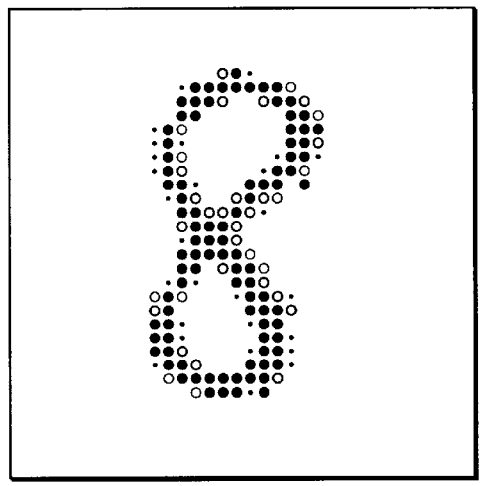

On the other hand, if $C_1 > C_0$, i.e., if $C_1$ is increased from $C_0$, the transformed image $F^*$ is set as a new input gray-scale image F, and an affine transformation is applied to the new input image F in such a way as to maximize weighted normalized cross-correlation. This is repeated until step S151 determines that the normalized cross correlation value $C_1$ is not increased from $C_0$ (step S151). After the value $C_1$ monotonously, increases and converges, the value $C_1$ is a maximal normalized cross-correlation value, and the value $C_1$ is sent as a matching result for the input gray-scale image F to the image output unit 4 (step S4). This completes the matching operation. FIGS. 4A to 4F show a matching operation based on iterations of affine transformations according to this embodiment carried out on a character pattern "8" set on a two-dimensional plane. FIG. 4A shows an input gray-scale image, and FIG. 4B shows a target gray-scale image. In FIGS. 4A to 4F, the gray level of each pixel is quantized in 5 levels with "●"=5, "◎"=4, "○"=3, "."=2, " " (null)=1.

Figure 4C:
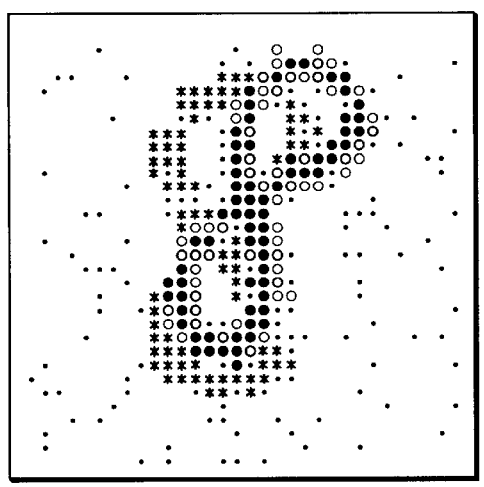
Figure 4D:
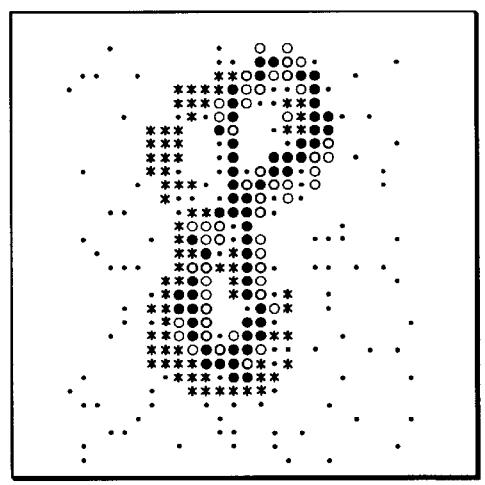
Figure 4E:
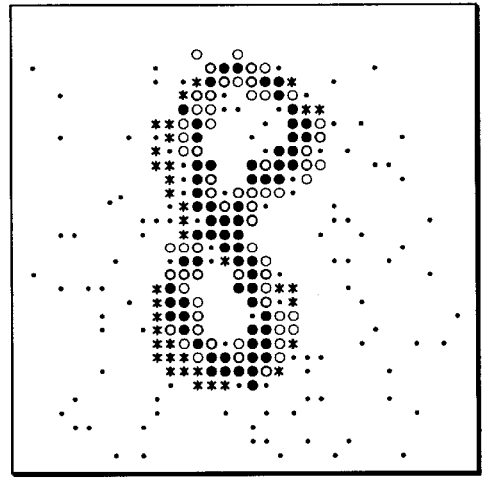
Figure 4F:
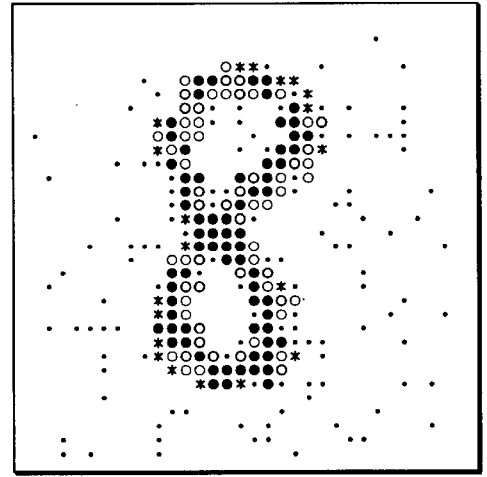

In FIG. 4C, the input image is superimposed on the target image. Each pixel of the target image having a gray level of 2 or above is represented with "*." FIGS. 4D, 4E, and 4F show affine-transformation-superimposed input gray-scale images laid on the target gray-scale image. The image of FIG. 4D involves an iteration of affine transformation, the image of FIG. 4E involves 5 iterations of affine transformation, and the image of FIG. 4F involves 12 iterations of affine transformation. In FIGS. 4D to 4F, each pixel of the target image having a gray level of 2 or above is represented with "*." Normalized cross-correlation values monotonously increase in order of 0.280, 0.356, 0.679, and 0.822 from FIG. 4C to FIG. 4F. In this example, increases in the normalized cross-correlation values converge at the iteration number of 12 to complete the iterations of affine transformation.

As shown in FIGS. 4A to 4F, the normalized cross-correlation values increase from the state of FIG. 4C to the final state of FIG. 4F as the number of iterations of affine transformation increases. In the final state of FIG. 4F, most of the points of the input gray-scale image overlap the points of the target gray-scale image. A maximal normalized cross-correlation value of 0.822 is quite close to a theoretical value of 0.908 of this example. As shown in FIG. 4A, the input gray-scale image involves large translation, distortion, and noise. Even on such an image, the present invention iterates affine transformation to accurately identify the image.

FIG. 5 shows an exemplary hardware structure of an image retrieval system and a sequence of retrieving images including a specified logo from a database that stores a large quantity of images, according to an embodiment of this present invention.

A logo 40 is used as a retrieval key to retrieve image frames that contain the logo 40 from a large quantity of images. An image of the logo 40 is read by, for example, a scanner 42 and is stored as a target gray-scale image 41 in the target image storage unit 3 (FIG. 1).

Images serving as input images are accumulated in an input gray-scale image database 43. In this example, the affine transformation according to this embodiment is applied to the target gray-scale image 41 instead of the input gray-scale images, to match the target gray-scale image 41 and each input gray-scale image.

Each image frame that includes a partial image whose normalized cross-correlation value with respect to the target image is above a threshold is provided as a retrieval result image 46 from an output device such as a printer 45. Even if the input logo 40 is inclined or deteriorated with noise, this embodiment is capable of accurately identifying the logo and retrieving data related to the logo.

In this way, this embodiment is capable of providing a retrieval service that easily and quickly retrieves desired images from image contents with an image key.

Note that the image matching process carried out by the image identification apparatus 1 may be stored as a program in a recording medium such as a portable memory, e.g., a CD-ROM, a semiconductor memory, and a hard disk readable by a computer 44. The stored program is loaded to a main memory of the computer 44 and is executed thereby. Note also that the recording medium as such may be distributed through a network or offline.

As explained above, for an input gray-scale image that may contain arbitrary affine transformation (rotation, scale change, shearing, and translation) and noise, this embodiment efficiently calculates affine parameters with a practical number of processes, generates an affine-transformation-superimposed input gray-scale image based on the affine parameters, calculates a normalized cross-correlation value between the transformed image and a target image, and repeats these steps to obtain a maximal normalized cross-correlation value to stably and accurately identify the input image.

In particular, this embodiment maximizes a weighted normalized cross-correlation by solving simultaneous linear equations that employ gray-scale gradient information to enhance image matching, and therefore, is simple and involves a small number of processes. In addition, the affine transformation process of this embodiment involves no optional control parameters, and therefore, realizes general purpose gray-scale image identification.

In summary, the technique of identifying a gray-scale image according to the present invention absorbs a wide range of translations and distortions related to arbitrary affine transformations (rotation, scale change, shearing, and translation) between gray-scale images, realizes noise tolerance, and carries out an accurate matching process by maximizing a normalized cross-correlation value through a small number of processes.

Therefore, even if an input gray-scale image involves noise, distortion, blur, or background texture, the present invention realizes noise tolerance by employing normalized cross-correlation as a matching scale. The present invention applies an optimal affine transformation to an input gray-scale image or a target gray-scale image to shape the image in such a way as to maximize a normalized cross-correlation with respect to the target image. This technique realizes distortion tolerance for a wide range of affine transformations. Unlike the conventional technique that must store a considerable number of distorted target images in advance to achieve only a limited distortion tolerance and linearly increase a storage space requirement and the number of processes, the present invention needs only a single target image to suppress the number of processes and realize gray-scale image identification that has noise tolerance and distortion tolerance in practical environments.

Consequently, the present invention is advantageous when applied to gray-scale image identification in the fields of pattern recognition, motion analysis, and stereo vision using computers. The present invention is also useful for accurately and speedily retrieving images from a large database of images with an desired partial image serving as a retrieval key.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of matching input gray-scale image data (F) and target image data (G), the data (F) being composed of a set of gray levels representative of points that form an image, comprising the steps of:

(a) calculating weighting coefficient based on interpoint distances between each point of the input gray-scale image data F and each point of the target image data G, and inner products of gray-scale gradients at the points of the input gray-scale image data F and target image data G;

(b) determining affine parameter for the input gray-scale image data F based on the calculated weighting coefficient;

(c) applying an affine transformation to the input gray-scale image data F based on the determined affine parameter to shape the input gray-scale image data F into affine-transformation-superimposed input gray-scale image data F*;

(d) calculating a correlation value between the affine-transformation-superimposed input gray-scale image data F* and the target image data G; and (e) providing, as a matching result for the target image data G, the affine-transformation-superimposed input gray-scale image data F* that provides a maximal correlation value and the maximal correlation value itself.

2. The method of claim 1, wherein the correlation value calculated in the step (d) is a normalized cross-correlation value which is defined as the correlation value calculated between two gray-scale image data with normalized gray levels of zero average and unit variance.

3. The method of claim 1, wherein the step (a) includes the steps of:
   (a1) calculating an interpoint distance between each point r in the input gray-scale image data F and each point r' in the target image data G, as well as an inner product of gray-scale gradients at the points r and r';
   (a2) calculating, based on the calculated interpoint distance, a unique window parameter; and
   (a3) calculating the weighting coefficient based on Gaussian kernels of the calculated interpoint distances, the calculated inner products of gray scale gradients, and the calculated window parameter.

4. The method of claim 1, wherein the step (b) calculates the affine parameter with a 2-row-by-2-column matrix that rotates, scale-changes, or distorts each two-dimensional point r of the input gray-scale image data F and a two-dimensional vector that translates the point r, in such a way as to provide a maximal correlation value.

5. The method of claim 1, wherein the step (b) solves simultaneous linear equation containing the weighting coefficient and affine parameter as unknown variables to determine affine parameters that provides a maximal correlation value.

6. The method of claim 1, wherein the step (c) includes the steps of:
   (c1) applying the affine transformation based on the determined affine parameter by successively specifying, if the input data F is digital data instead of analog data, positional coordinates of the transformed data F* and by carrying out an inverse transformation; and
   (c2) forming integer positional coordinates based on the positional coordinates provided by the inverse transformation and substituting gray levels at the integer positional coordinates of the input data F for gray levels at the specified positional coordinates of the affine-transformation-superimposed input gray-scale image data F* corresponding to the integer positional coordinates, thereby shaping the affine-transformation-superimposed input gray-scale image data F*.

7. The method of claim 1, further comprising the step of:
   (f) outputting the matching result or an image corresponding to the matching result.

8. A method of matching input gray-scale image data (F) and target image data (G), the data (F) being composed of a set of gray levels representative of points that form an image, comprising the steps of:
   (aa) calculating Gaussian kernel interpoint weighting coefficient based on each interpoint distance $\|r-r'\|$ between each point r in the input gray-scale image data F and a each point r' in the target image data G and an inner product $\nabla f(r) \cdot \nabla g(r')$ of gray-scale gradients for a gray level f(r) at the point r and a gray level g(r') at the point r';
   (bb) determining affine parameter for the input gray-scale image data F based on the calculated Gaussian kernel weighting coefficient in such a way as to maximize a weighted correlation;
   (cc) applying an affine transformation to the input gray-scale image data F based on the determined affine parameter to shape the input gray-scale image data F into affine-transformation-superimposed input gray-scale image data F*;
   (dd) calculating a correlation value $C_1$ between the affine-transformation-superimposed input gray-scale image data F* and the target image data G as well as a correlation value $C_0$ between the input gray-scale image data F and the target image data G; and
   (ee) comparing the correlation values $C_1$ and $C_0$ with each other, and if $C_1 > C_0$, substituting the affine-transformation superimposed input gray-scale image data F* for the input gray-scale image data F and repeating the steps (aa) to (dd), and if not $C_1 > C_0$, providing a maximal correlation value $C_0$ and the affine-transformation-superimposed input gray-scale image data F* corresponding to the maximal correlation value $C_0$, as a matching result for the target image data G.

9. The method of claim 8, wherein if the correlation value $C_0$ is above prescribed threshold, the step (ee) provides a maximal correlation value $C_0$ and the affine-transformation-superimposed input gray-scale image data F* corresponding to the maximal correlation value $C_0$ as a matching result for the target data G.

10. A method of retrieving desired image data that includes target image data (G) from stored gray-scale image data by matching each data piece (F) inputted form the stored image data and the target image data (G), the data (F) being composed of a set of gray levels representative of points that form an image, comprising the steps of:
   (aaa) calculating weighting coefficient based on interpoint distances between each point of the input gray-scale image data F and each point of the target image data G and inner products of gray-scale gradients at the points of the input gray-scale image data F and target image data G;
   (bbb) determining affine parameter for the target image data G based on the calculated weighting coefficient;
   (ccc) applying an affine transformation to the target image data G based on the determined affine parameter to shape the target image data G into affine-transformation-superimposed target gray-scale image data G*;
   (ddd) calculating a correlation value between the affine-transformation-superimposed target gray-scale image data G* and the input gray-scale image data F; and
   (eee) providing the input gray-scale image data F with which the maximal correlation value exceeds prescribed threshold and the maximal correlation value itself as a retrieval result of a gray-scale image data containing the target image data G.

11. The method of claim 10, wherein the correlation value calculated in the step (ddd) is a normalized cross-correlation value which is defined as the correlation value calculated between two gray-scale image data with normalized gray levels of zero average and unit variance.

12. The method of claim 10, wherein the step (aaa) includes the steps of:
   (aaa1) calculating an interpoint distance between each point r in the input gray-scale image data F and each point r' in the target image data G, as well as an inner product of a gray-scale gradients at the points r and r';

(aaa2) calculating, based on the calculated interpoint distance, a unique window parameter; and (aaa3) calculating the weighting coefficient based on Gaussian kernels of the calculated interpoint distances, the calculated inner products, and the calculated window parameter.

13. The method of claim 10, wherein the step (bbb) calculates the affine parameters with a 2-row-by-2-column matrix that rotates, scale-changes, or distorts each two-dimensional point r of the input gray-scale image data F and a two-dimensional vector that translates the point r, in such a way as to provide a maximal correlation value.

14. The method of claim 10, wherein the step (bbb) solves simultaneous linear equation containing the weighting coefficient and affine parameter as unknown variables to determine affine parameter that provides a maximal correlation value.

15. The method of claim 10, further comprising the step of
   (fff) outputting the retrieval result or images corresponding to the retrieval result.

16. An apparatus for matching input gray-scale image data (F) and target image data (G), the data (F) being composed of a set of gray levels representative of points that form in image, comprising:
   (a) a unit for calculating weighting coefficient based on interpoint distances between each point of the input gray-scale image data F and each point of the target image data G, and inner products of gray-scale gradients at the points of the input gray-scale image data F and target image data G;
   (b) a unit for determining affine parameter for the input gray-scale image data F based on the calculated weighting coefficient;
   (c) a unit for applying an affine transformation to the input gray-scale image data F based on the determined affine parameter to shape the input gray-scale image data F into affine-transformation-superimposed input gray-scale image data F*;
   (d) a unit for calculating a correlation value between the affine-transformation-superimposed input gray-scale image data F* and the target image data G; and
   (e) a unit for providing, as a matching result for the target image data G, the affine-transformation-superimposed input gray-scale image data F* that provides a maximal correlation value and the maximal correlation value itself.

17. The apparatus of claim 16, wherein the correlation value calculated by the unit (d) is a normalized cross-correlation value which is defined as the correlation value calculated between two gray-scale image data with normalized gray levels of zero average and unit variance.

18. The apparatus of claim 16, wherein the unit (a) includes:
   (a1) a unit for calculating an interpoint distance between each point r in the input gray-scale image data F and each point r' in the target image data G, as well as an inner product of gray-scale gradients at the points r and r';
   (a2) a unit for calculating, based on the calculated interpoint distance, a unique window parameter; and
   (a3) a unit for calculating the weighting coefficient based on Gaussian kernels of the calculated interpoint distances, the calculated inner products of gray scale gradients, and the calculated window parameter.

19. The apparatus of claim 16, wherein the unit (b) calculates the affine parameter with a 2-row-by-2-column matrix that rotates, scale-changes, or distorts each two-dimensional point r of the input gray-scale image data F and a two-dimensional vector that translates the point r, in such a way as to provide a maximal correlation value.

20. The apparatus of claim 16, wherein the unit (b) solves simultaneous linear equation containing the weighting coefficient and affine parameter as unknown variables to determine affine parameter that provides a maximal correlation value.

21. The apparatus of claim 16, wherein the unit (c) 35 includes:
   (c1) a unit for applying the affine transformation based on the determined affine parameter by successively specifying, if the input data F is digital data instead of analog data, positional coordinates of the transformed data F* and by carrying out an inverse transformation; and
   (c2) a unit for forming integer positional coordinates based on the positional coordinates provided by the inverse transformation and substituting gray levels at the integer positional coordinates of the input data F for gray levels at the specified positional coordinates of the affine-transformation-superimposed input gray-scale image data F* corresponding to the integer positional coordinates, thereby shaping the affine-transformation-superimposed input gray-scale image data F*.

22. The apparatus of claim 16, further comprising:
   (f) a unit for outputting the matching result or an image corresponding to the matching result.

23. An apparatus for matching input gray-scale image data (F) and target image data (G), the data (F) being composed of a set of gray levels representative of points that form an image, comprising:
   (aa) a unit for calculating Gaussian kernel interpoint weighting coefficient based on each interpoint distance $\|r-r'\|$ between each point r in the input gray-scale image data F and each point r' in the target image data G and an inner product $\nabla f(r) \cdot \nabla g(r')$ of gray-scale gradients for a gray level f(r) at the point r and a gray level g(r') at the point r';
   (bb) a unit for determining affine parameter for the input gray-scale image data F based on the calculated Gaussian kernel weighting coefficient in such a way as to maximize a weighted correlation;
   (cc) a unit for applying an affine transformation to the input gray-scale image data F based on the determined affine parameter to shape the input gray-scale image data F into affine-transformation-superimposed input gray-scale image data F*;
   (dd) a unit for calculating a correlation value $C_1$ between the affine-transformation-superimposed input gray-scale image data F* and the target image data G as well as a correlation value $C_0$ between the input gray-scale image data F and the target image data G; and
   (ee) a unit for comparing the correlation values $C_1$ and $C_0$ with each other, and if $C_1 > C_0$, substituting the affine-transformation superimposed input gray-scale image data F* for the input gray-scale image data F and repeating the operations carried out by the units (aa) to (dd), and if not $C_1 > C_0$, providing a maximal correlation value $C_0$ and the affine-transformation-superimposed input gray-scale image data F* corresponding to the maximal correlation value $C_0$ as a matching result for the target image data G.

24. The apparatus of claim 23, wherein, if the correlation value $C_0$ is above prescribed threshold, the unit (ee) provides a maximal correlation value $C_0$ and the affine-transformation-superimposed input gray-scale image data F* corresponding to the maximal correlation value $C_0$ as a matching result for the target data G.

25. An apparatus for retrieving desired image data that includes target image data (G) from stored gray-scale image data by matching each data piece (F) inputted form the stored image data and the target image data (G), the data (F) being composed of a set of gray levels representative of points that form an image, comprising:
   (aaa) a unit for calculating weighting coefficient based on interpoint distances between each point of the input gray-scale image data F and each point of the target image data G and inner products of gray-scale gradients at the points of the input gray-scale image data F and target image data G;
   (bbb) a unit for determining affine parameter for the target image data G based on the calculated weighting coefficient;
   (ccc) a unit for applying an affine transformation to the target image data G based on the determined affine parameter to shape the target image data G into affine-transformation-superimposed target gray-scale image data G*;
   (ddd) a unit for calculating a correlation value between the affine-transformation-superimposed target gray-scale image data G* and the input gray-scale image data F; and
   (eee) a unit for providing the input gray-scale image data F with which the maximal correlation value exceeds prescribed threshold and the maximal correlation value itself as a retrieval result of a gray-scale image data containing the target image data G.

26. The apparatus of claim 25, wherein the correlation value calculated by the unit (ddd) is a normalized cross-correlation value which is defined as the correlation value calculated between two gray-scale image data with normalized gray levels of zero average and unit variance.

27. The apparatus of claim 25, wherein the unit (aaa) includes:
   (aaa1) a unit for calculating an interpoint distance between each point r in the input gray-scale image data F and each point r' in the target image data G, as well as an inner product of a gray-scale gradients at the points r and r';
   (aaa2) a unit for calculating, based on the calculated interpoint distance, a unique window parameter; and
   (aaa3) a unit for calculating the weighting coefficient based on Gaussian kernels of the calculated interpoint distances, the calculated inner products, and the calculated window parameter.

28. The apparatus of claim 25, wherein the unit (bbb) calculates the affine parameters with a 2-row-by-2 column matrix that rotates, scale-changes, or distorts each two-dimensional point r of the input gray-scale image data F and a two-dimensional vector that translates the point r, in such a way as to provide a maximal correlation value.

29. The apparatus of claim 25, wherein the unit (bbb) solves simultaneous linear equation containing the weighting coefficient and affine parameter as unknown variables to determine affine parameter that provides a maximal correlation value.

30. The apparatus of claim 25, further comprising:
   (fff) a unit for outputting the retrieval result or images corresponding to the retrieval result.

31. A computer readable recording medium recording a program for causing the computer to execute processing for matching input gray-scale image data (F) and target image data (G), the data (F) being composed of a set of gray levels representative of points that form in image, the processing including:
   (a) a process for calculating weighting coefficient based on interpoint distances between each point of the input gray-scale image data F and each point of the target image data G, and inner products of gray-scale gradients at the points of the input gray-scale image data F and target image data G;
   (b) a process for determining affine parameter for the input gray-scale image data F based on the calculated weighting coefficient;
   (c) a process for applying an affine transformation to the input gray-scale image data F based on the determined affine parameter to shape the input gray-scale image data F into affine-transformation-superimposed input gray-scale image data F*;
   (d) a process for calculating a correlation value between the affine-transformation-superimposed input gray-scale image data F* and the target image data G; and
   (e) a process for providing, as a matching result for the target image data G, the affine-transformation-superimposed input gray-scale image data F* that provides a maximal correlation value and the maximal correlation value itself.

32. The recording medium of claim 31, wherein the correlation value calculated in the process (d) is a normalized cross-correlation value which is defined as the correlation value calculated between two gray-scale image data with normalized gray levels of zero average and unit variance.

33. The recording medium of claim 31, wherein the process (a) includes:
   (a1) a process for calculating an interpoint distance between each point r in the input gray-scale image data F and each point r' in the target image data G, as well as an inner product of gray-scale gradients at the points r and r';
   (a2) a process for calculating, based on the calculated interpoint distance, a unique window parameter; and
   (a3) a process for calculating weighting coefficient based on Gaussian kernels of the calculated interpoint distances, the calculated inner products of gray-scale gradients, and the calculated window parameter.

34. The recording medium of claim 31, wherein the process (b) calculates the affine parameter with a 2-row-by-2-column matrix that rotates, scale-changes, or distorts each two-dimensional point r of the input gray-scale image data F and a two-dimensional vector-that translates the point r, in such a way as to provide a maximal correlation value.

35. The recording medium of claim 31, wherein the process (b) solves simultaneous linear equation containing the weighting coefficient and affine parameter as unknown variables to determine affine parameter that provides a maximal correlation value.

36. The recording medium of claim 31, wherein the process (c) includes:
   (c1) a process for applying the affine transformation based on the determined affine parameter by successively specifying, if the input data F is digital data instead of analog data, positional coordinates of the transformed data F* and by carrying out an inverse transformation; and
   (c2) a process for forming integer positional coordinates based on the positional coordinates provided by the inverse transformation and substituting gray levels at the integer positional coordinates of the input gray-scale image data F for gray levels at the specified positional coordinates of the affine-transformation-superimposed input gray-scale image data F* corresponding to the integer positional coordinates, thereby shaping the affine-transformation-superimposed input gray-scale image data F*.

37. The recording medium of claim 31, further including:
(f) a process for outputting the matching result or an image corresponding to the matching result.

38. A computer readable recording medium recording a program for causing the computer to execute processing for matching input gray-scale image data (F) and target image data (A), the data (F) being composed of a set of gray levels representative of points that form an image, the processing comprising:
(aa) a process for calculating Gaussian kernel interpoint weighting coefficient based on each interpoint distance $\|r-r'\|$ between each point r in the input gray-scale image data F and each point r' in the target image data G and an inner product $\nabla f(r) \cdot \nabla g(r')$ of gray-scale gradients for a gray level f(r) at the point r and a gray level g(r') at the point r';
(bb) a process for determining affine parameter for the input gray-scale image data F based on the calculated Gaussian kernel weighting coefficient in such a way as to maximize a weighted correlation;
(cc) a process for applying an affine transformation to the input gray-scale image data F based on the determined affine parameter to shape the input gray-scale image data F into affine-transformation-superimposed input gray-scale image data F*;
(dd) a process for calculating a correlation value $C_1$ between the affine-transformation-superimposed input gray-scale image data F* and the target image data G as well as a correlation value $C_0$ between the input gray-scale image data F and the target image data G; and
(ee) a process for comparing the correlation values $C_1$ and $C_0$ with each other, and if $C_1 > C_0$, substituting the affine-transformation superimposed input gray-scale image data F* for the input gray-scale image data F and repeating the operations carried out by the units (aa) to (dd), and if not $C_1 > C_0$, providing a maximal correlation value $C_0$ and the affine-transformation-superimposed input gray-scale image data F* corresponding to the maximal correlation value $C_0$ as a matching result for the target image data G.

39. The recording medium of claim 38, wherein, if the correlation value $C_0$ is above prescribed threshold, the process (ee) provides a maximal correlation value $C_0$ and the affine-transformation-superimposed input gray-scale image data F* corresponding to the maximal correlation value $C_0$ as a matching result for the target data G.

40. A computer readable recording medium recording a program for causing the computer to execute processing for retrieving desired image data that includes target image data (G) from stored gray-scale image data by matching each data piece (F) inputted form the stored image data and the target image data (G), the data (F) being composed of a set of gray levels representative of points that form an image, the processing including:
(aaa) a process for calculating weighting coefficient based on interpoint distances between each point of the input gray-scale image data F and each point of the target image data G and inner products of gray-scale gradients at the points of the input gray-scale image data F and target image data G;
(bbb) a process for determining affine parameter for the target image data G based on the calculated weighting coefficient;
(ccc) a process for applying an affine transformation to the target image data G based on the determined affine parameter to shape the target image data G into affine-transformation-superimposed target gray-scale image data G*;
(ddd) a process for calculating a correlation value between the affine-transformation-superimposed target gray-scale image data G* and the input gray-scale image data F; and
(eee) a process for providing the input gray-scale image data F with which the maximal correlation value exceeds prescribed threshold and the maximal correlation value itself as a retrieval result of a gray-scale image data containing the target image data G.

41. The recording medium of claim 40, wherein the correlation value calculated in the process (ddd) is a normalized cross-correlation value which is defined as the correlation value calculated between two gray-scale image data with normalized gray levels of zero average and unit variance.

42. The recording medium of claim 40, wherein the process (aaa) includes:
(aaa1) a process for calculating an interpoint distance between each point r in the input gray-scale image data F and each point r' in the target image data G, as well as an inner product of a gray-scale gradients at the points r and r';
(aaa2) a process for calculating, based on the calculated interpoint distance, a unique window parameter; and
(aaa3) a process for calculating the weighting coefficient based on Gaussian kernels of the calculated interpoint distances, the calculated inner products, and the calculated window parameter.

43. The recording medium of claim 40, wherein the process (bbb) calculates the affine parameters with a 2-row-by-2-column matrix that rotates, scale-changes, or distorts each two-dimensional point r of the input grayscale image data F and a two-dimensional vector that translates the point r, in such a way as to provide a maximal correlation value.

44. The recording medium of claim 40, wherein the process (bbb) solves simultaneous linear equation containing the weighting coefficient and affine parameter as unknown variables to determine affine parameter that provides a maximal correlation value.

45. The recording medium of claim 40, further including:
(fff) a process for outputting the retrieval result or images corresponding to the retrieval result.

* * * * *